United States Patent [19]
Packard

[11] 3,786,438
[45] Jan. 15, 1974

[54] OPTICAL READ-ONLY MEMORY SYSTEM INCLUDING A CATHODE RAY TUBE

[75] Inventor: James R. Packard, St. Paul, Minn.

[73] Assignee: Minnesota Mining and Manufacturing Company, St. Paul, Minn.

[22] Filed: June 26, 1972

[21] Appl. No.: 266,299

[52] U.S. Cl.340/173 R, 340/173 CR, 340/173 LM, 315/529
[51] Int. Cl. .......................... G11c 11/30, G11c 13/04
[58] Field of Search .................. 340/173 R, 173 CR, 340/173 LM; 315/529

[56] References Cited

UNITED STATES PATENTS

| | | | |
|---|---|---|---|
| 3,693,040 | 9/1972 | Takita | 340/173 CR |
| 3,718,914 | 2/1973 | Muller | 340/173 CR |

*Primary Examiner*—Terrell W. Fears
*Attorney*—Kinney, Alexander, Sell, Steldt & Delahunt

[57] ABSTRACT

A system for optically reading in parallel a plurality of bits contained in a predetermined pattern in a data array on a planar data mask containing a plurality of data arrays. A conical beam of coherent light produced from a selected location on a planar laser material screen of a cathode ray tube is addressed to a given data array, thereby causing an image representative of said given data array to be projected onto a detector array containing a plurality of detectors in the same predetermined pattern. The planar laser material screen is positioned parallel to the planar datamask. The addressed given data array is the data array positioned within the cone of light and in an optical plath including the detector array and the selected light emitting location on the screen.

5 Claims, 4 Drawing Figures

OPTICAL READ-ONLY MEMORY SYSTEM INCLUDING A CATHODE RAY TUBE

CROSS-REFERENCE TO RELATED APPLICATION

This application is related to copending U. S. Pat. application Ser. No. 42,437, filed June 1, 1970, which is a continuation-in-part of U. S. Pat. application Ser. No. 32,330, filed Apr. 27, 1970, now abandoned, and of U. S. Pat. No. 599,576, filed Dec. 6, 1966, now abandoned.

BACKGROUND OF THE INVENTION

The present invention generally pertains to optical read-only memory systems and is specifically directed to such systems wherein a plurality of bits contained in a predetermined pattern in a data array are read out in parallel from a planar information bearing medium containing a plurality of detectors in the same predetermined pattern.

In a prior art system of this nature, the information bearing medium is a datamask; and an image of the given data array is projected onto a stationary detector array by addressing impingement given data array with light from that one of a given number of selective discrete light sources which is in optical alignment with both the detector array and the given data array. Such a system is described in U. S. Letters Patent No. 3,656,120. The fact that the light sources are discrete, limits the array configuration and position and the capacity of any datamasks which may be used therewith.

Prior to the issuance of such patent, the prior art devices had included a separate optical steering element for each corresponding discrete light source and data array combination. Such optical steering elements are provided in one such system by interposing a fly's-eye array of lenses between the datamask and the detector array. In another such system, fiber-optical elements are so interposed. Although the above-cited prior art patent describes a system not requiring optical steering elements for addressing given data arrays and projecting images thereof, such patent does not appear to satisfactorily treat the geometrical considerations which must be met to construct such a system. While this prior art patent correctly states that the datamask may be positioned between the emitters (light sources) and the area wherein the light paths therefrom intersect, it incorrectly states that the datamask may also be positioned between the sensors (detector array) and the area wherein the light paths from the emitters intersect. Also, this prior art patent does not describe how to determine how close the datamask may be positioned from the light sources.

Also, it was suggested by Bogdankevich et al. in Radiotekhnika i Electronika, 16, No. 5 (1971 ) that it would be feasible to use a cathode ray tube having a plane-parallel semiconductor plate, in which exitation by an electron beam and lasing occur in a direction perpendicular to the plate surface, for providing rapid and random access of information from a microphotographic transparency data array memory; but how a system having such capability would be constructed was not described.

SUMMARY OF THE INVENTION

I have discovered that by using a specially constructed type of cathode ray tube for providing the light source, it is possible to randomly and rapidly address any given data array and project an image thereof onto the detector array in a read-only memory ststem not requiring a given number of discrete light sources.

The specially constructed cathode ray tube used in the system of the present invention necessarily includes an electron gun for producing an electron beam; and a planar screen positioned parallel to the planar information bearing medium, and comprising material for emitting a conical beam of electromagnetic radiation, such as light, normal to the screen plane in response to impingement by the electron beam. The specially constructed cathode ray tube also necessarily includes means for deflecting the electron beam to provide the conical electromagnetic radiation beam from a selected location on the screen for addressing any given data array for projecting onto the detector array, an image of the addressed given data array positioned within said cone of radiation and in an optical path including the detector array and the selected location on the screen.

The present invention preferably includes a cathode ray tube having a screen comprising a laser material for emitting a conical beam of coherent electromagnetic radiation normal to the screen plane when excited into a stimulated emission state by the electron beam. The principles of operation of this "laser material" cathode ray tube are described in my co-authored articles appearing in the Nov. 1971 *Applied Physics Letters* at pages 338–340, in the June 1967 *Journal of Applied Physics* at pages 3,035–3,036, and in the above cross-referenced copending application, all of which are incorporated herein by reference.

In such a cathode ray tube, the screen preferably includes as the laser material, a crystal of a direct band-gap semiconductor, having a pair of major broad optically smooth opposing parallel surfaces; and means providing almost totally reflective surfaces parallel to each broad crystal surface, one surface being more reflective than the other.

The prior art limitation incident to the light sources being discrete, is thus obviated because the cathode ray tube screen is not limited as to the number or location of such available light sources. Also, by utilizing the feature of the specially constructed cathode ray tube planar screen wherein the electromagnetic radiation produced from the selected location on the planar laser material is emitted in a cone which is normal to the laser material plane, it is not necessary to include optical steering elements for addressing given data arrays and projecting images thereof. According to the present invention, in order to project an image of a given data array onto the detector array, the electron beam is deflected to a selected location on the laser material for producing a cone of electromagnetic radiation encompassing an optical path which includes the selected location on the screen and both the detector array and the addressed given data array.

The geometric consideration which must be met in order to construct an operable embodiment of the present invention will be better understood by referring to FIG. 1 wherein a light cone 10 is shown as being emitted from a location on the perimeter of the exposed broad planar surface 12 of a planar laser material screen 14 in response to the impingement of an electron beam 16. The light cone 10 diverges at an angle $\theta$. The approximate addressable broad dimension of the exposed broad planar surface 12 of the laser material screen 14 is designated L. A datamask memory plane 18 containing a plurality of data arrays 20 each of an approximate diameter $D_A$ is positioned a distance Z from and parallel to the exposed broad planar surface 12 of the laser material screen 14. Each data array 20 contains a plurality of data bits each bit having an approximate diameter $D_B$ which is substantially greater than the diameter of the light emission spot at the exposed broad planar surface 12 of the laser material 14. The spot diameter generally corresponds to that of the electron beam 16. The detector array 22 is positioned a distance A + B from the datamask memory plane 18. The cone is of a diameter Y at the datamask memory plane 18, and of 2 diameter X at the plane of the detector array 22.

It is seen that if the electron beam generated from the laser emission source is appropriately deflected to selected locations on the planar surface 12 of the laser material 14, each data array 20 in the datamask memory plane 18 may be separately projected onto the single detector array 22.

Referring to FIG. 1, and considering the equations:

$$L/2/\theta/2 = A, ({}^{D}D/2/-/2) = B,$$

and $X/2/\theta/2 = (A + B)$;
and
$X/D_D = Y/D_A$, $Y/2 = Z(\theta/2)$. Then $Z = Y/2\theta/2 = {}^{D}A^{X}/2D_D\theta/2 = ({}^{D}A/D_D)\ (A+B)\ (\theta/2/\theta/2)$.
Thus,
$Z = ({}^{D}A/D_D)\ [(L/\theta) + ({}^{D}D/\theta)\ ]$.
Also, $\theta Z$ must be greater than or equal to $2D_A$.

DESCRIPTION OF THE PREFERRED EMBODIMENT

Figure 1:
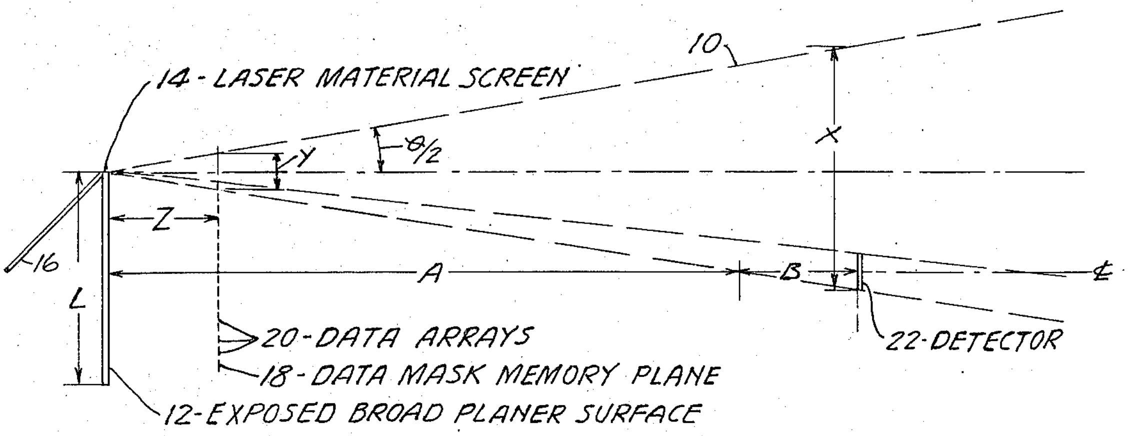
FIG. 1 is an illustration of certain geometrical considerations pertinent to the system of the present invention.
Figure 2:
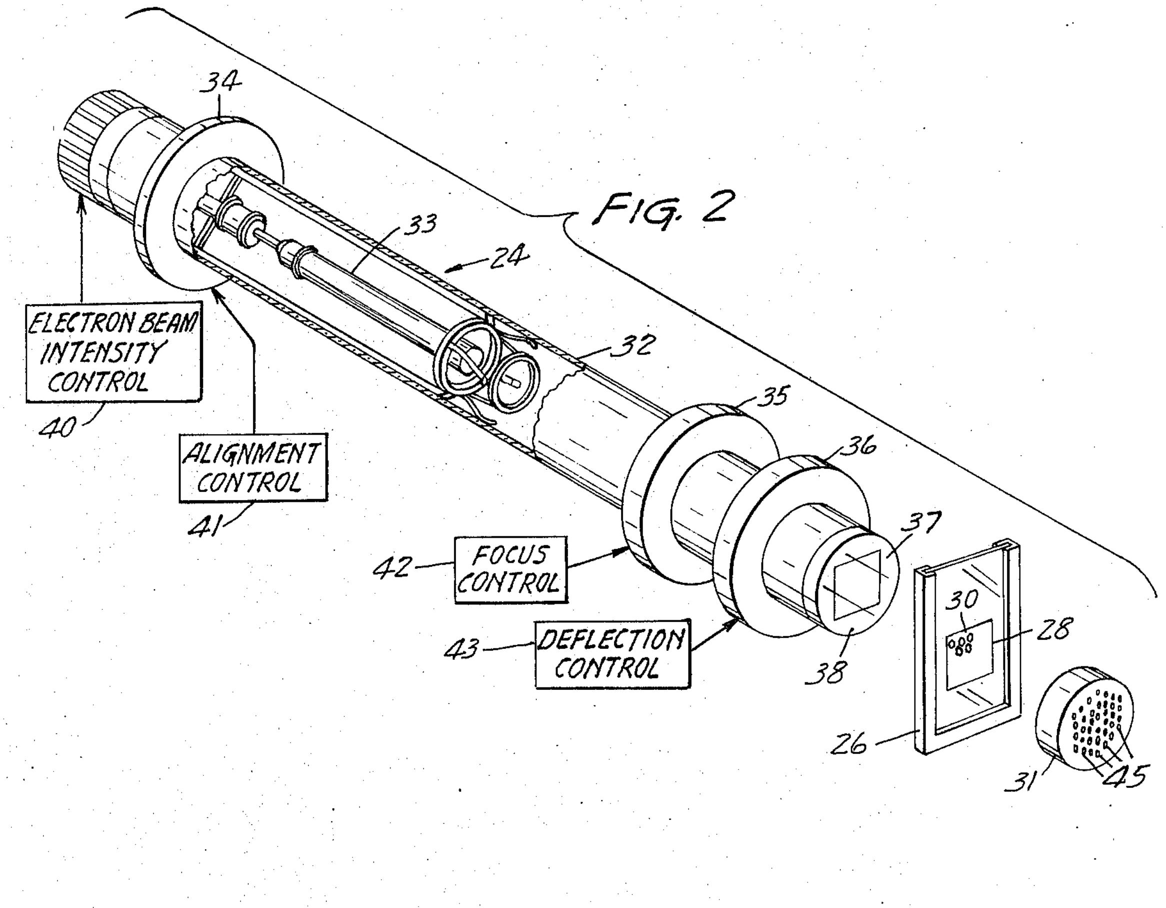
FIG. 2 shows the system of the present invention, with the distances between the discrete elements distorted to better illustrate their configuration. The relative distances between the discrete elements is shown in FIG. 1.

FIG. 2 shows a preferred embodiment of the optical read-only memory system of the present invention. The system includes the specially constructed cathode ray tube 24; a holder 26 for positioning a datamask 28 containing binary information arranged in a plurality of data arrays 30; and an array of photodetectors, 31. The cathode ray tube 24, the holder 26 and the detector array 31 are positioned in a fixed relationship to one another by means which are not shown in the drawing. The distances between these elements 24, 26, 31 is distorted in the drawing, but such distances for this embodiment are described below. The datamask 28 may be removed from holder 26 and be replaced by another like datamask in order to update the information in the memory.

The cathode ray tube 24 includes an evacuated tube 32 containing an electron gun 33, an alignment coil 34, a focus coil 35, a deflection coil 36 and a broad planar laser material 37 attached to the inside of a transparent sapphire face plate 38.

Electron beam intensity and current control circuits 40, an alignment control circuit 41, a focus control circuit 42 and a deflection control circuit 43 are also included.

The laser cavity of the laser material 37 is preferably a polished wafer of a single crystal direct band-gap semiconductor material. Semiconductor materials which have been found to be suitable for this application include zinc oxide, cadmium sulfide, cadmium selenide, and gallium arsenide. Selection of the laser material 37 involves consideration of the spectral response of the photodetector array and absorption characteristics of the datamask. A semiconductor material which will lase at room temperature is selected in accordance with the process described in British Pat. Specification No. 1,267,374. The semiconductor laser material is polished to provide two plano-parallel faces, which constitute the laser cavity. The spacing between the two faces then determines the cavity thickness, which is on order of 10–50 $\mu$m. The two lateral broad dimensions of the cavity are about 25 mm. The cavity faces are mirrored such as by vapor coating with silver or aluminum in order to achieve a reflectivity of about 96 per cent and about 92 per cent on the impinged and opposite cavity faces respectively.

In operation, an electron beam generated by the electron gun 33 impinges upon the inside cavity face of the laser material 37. The electron beam is focused such that the spot size is on the order of a diameter of about 25 $\mu$m. The current density is on the order of several amp/cm$^2$, and is in excess of the threshold level needed to generate stimulated emission in the laser material 37. The laser light beam emerges through the opposite cavity face, at a location opposite to the location impinged by the electron beam.

Deflection of the electron beam to any selected location on the broad impinged surface of the laser crystal 37 results in the generation of a coherent light beam from a corresponding location the broad opposite planar surface of the laser crystal 37. Thus, any one of data arrays 30 can be accessed at electronic speeds and in random fashion. The access time is determined by the state-of-the-art in magnetic deflection systems, and is presently believed to be on the order of about one (1) microsecond. The electron beam is impinged upon the laser material 37 in a pulsed mode with a pulse width of between 50–100 nanoseconds. The rise time and decay time of the laser emission is on the order of a few nanoseconds. Thus, the laser light pulse generally corresponds to the electron beam pulse.

Figure 3:
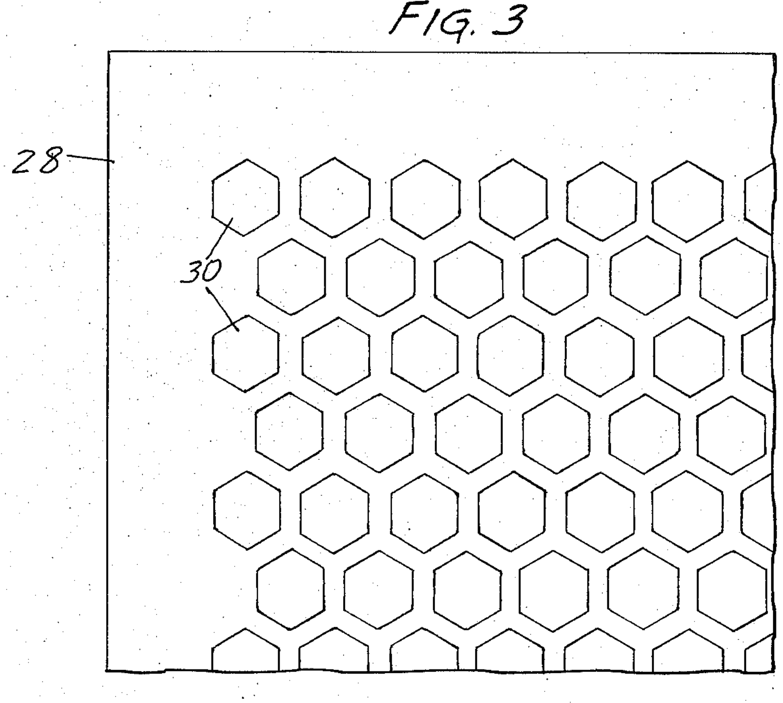
FIG. 3 is an illustration of a portion of the information bearing medium shown in FIG. 2.
Figure 4:
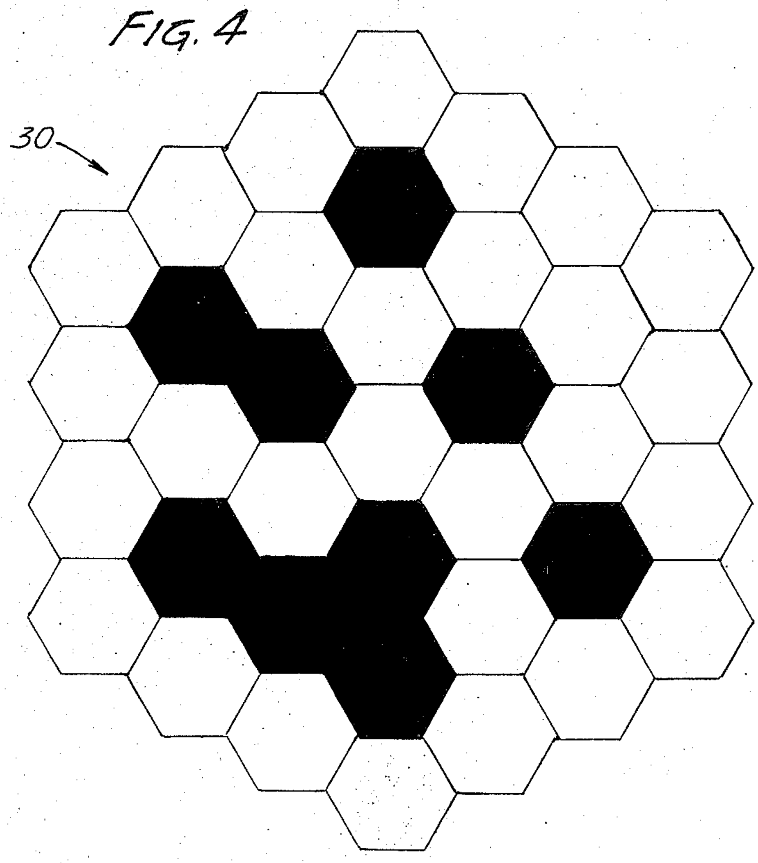
FIG. 4 is an illustration of one data array included in the plurality of data arrays shown schematically in FIG. 3. The bit pattern of this data array generally corresponds to the detector pattern in the detector array shown in FIG. 2.

FIG. 3 shows the preferred arrangement of data arrays 30 on the datamask 28. The arrays are arranged in interwoven rows and columns and are spaced from one another by approximately the diameter of one bit. A data array 30 consists of an array of 37 transparent or opaque hexagonal bits as shown in FIG. 4. With the exception of the hexagon in the center of data array 30, all hexagons represent binary information. A bit of one value, such as binary 1, is represented by a transparent hexagon and a bit of other value, such as binary 0, by an opaque hexagon. The 36 binary bits of information contained in a data array 30 constitutes a data word.

The datamask 28 is a glass plate which is coated with a high resolution, photographic emulsion to form the data arrays 30. The original write step, i.e., the placing of information on the datamask, is accomplished by conventional photo microimaging techniques. An alternative approach would be to utilize an electron beam recorder in conjunction with a computer to directly record the information without proceeding through the intermediate photo-reduction and photo-imaging steps.

Information stored on any one of the data arrays of the photomask 28 can be transferred to the detector array 31. The detector array consists of 36 detectors such as PIN diodes, each being at a position corresponding to that of a bit on data array 30 (FIG. 4). The presence or absence of a light spot can thus be transferred into electrical signals, on output leads 45, which signals can be amplified, read out and electronically processed in parallel.

In this preferred embodiment, the data array diameter $^D$A is approximately 875 $\mu$m and the detector array diameter $^D$D is approximately 25 mm. The approximate addressable broad dimension L of the laser material 37 is also 25 mm. The angle of divergence $\theta$ of the cone is about 10° or approximately 0.175 radians. Thus, the surface of the datamask 28 which contains the data arrays 30 is positioned a distance Z = 10 mm from the outside (opposite) surface of the laser material 37 and the detector array 31 is positioned a distance A + B = 28.6 cm from the outside surface of the laser material 37. The bit diameter $^D$B is 125 $\mu$m. Thus the center to center distance between data arrays is about 1 mm in the long dimension.

The above described embodiment, wherein a photo emulsion datamask is used as the information bearing medium, is but one of many. The system of the present invention is likewise useful with photochormic or liquid crystal memory media and with such media as employ a Kerr or Faraday effect upon polarized light. For use with the last described type of media, the system need additionally include only a polarizer between the laser material and the information bearing medium and an analyzer between the information bearing medium and the detector.

What is claimed is:

1. A system for optically reading in parallel, a plurality of bits contained in a predetermined pattern in a data array on a planar information bearing medium containing a plurality of data arrays; wherein when a beam of electromagnetic radiation is addressed to a given data array, an image representative of said given data array is projected onto a detector array containing a plurality of detectors in the same predetermined pattern, characterized by the feature that the means for both addressing any given data array and projecting an image representative of any said given data array onto said detector array, consists of a cathode ray tube comprising, an electron gun for producing an electron beam, a planar screen positioned parallel with the planar information bearing medium, and comprising material for emitting a conical beam of electromagnetic radiation normal to the screen plane in response to the by said electron beam, and means for deflecting said electron beam to provide a said conical electromagnetic radiation beam from a selected location on the screen for addressing any said given data array for projecting onto the detector array, an image of said addressed data array positioned within said cone of radiation and in an optical path including the detector array and the selected location on the screen.

2. A system for optically reading in parallel a plurality of bits contained in a predetermined pattern in a data array on a planar information bearing medium containing a plurality of data arrays, wherein when a beam of electromagnetic radiation is addressed to a given data array an image representative of said given data array is projected onto a detector array containing a plurality of detectors in the same predetermined pattern, characterized by the feature that the means for both addressing any given data array and projecting an image representative of any said give data array onto said detector array, consists of a cathode ray tube comprising an electron gun for producing an electron beam, a planar screen positioned parallel with the planar information bearing medium, and comprising laser material for emitting a conical beam of coherent electromagnetic radiation normal to the screen plane when excited into a stimulated emission state by said electron beam, and means for deflecting said electron beam to provide a said conical coherent radiation beam from a selected location on the screen for addressing any said given data array for projecting onto the detector array, an image of said addressed data array positioned within said cone of coherent electromagnetic radiation and in an optical path including the detector array and the selected location on the screen.

3. A system according to claim 2 wherein the cathode ray tube screen comprising laser material comprises a crystal of a direct band-gap semiconductor having a pair of major broad optically smooth opposing parallel surfaces; and means providing almost totally reflective surfaces parallel to each broad crystal surface, with one reflective surface being more reflective than the other;

whereby coherent electromagnetic radiation is emitted from said crystal through the least reflective of the reflective surfaces in a direction which is substantially normal to the broad crystal surfaces.

4. A system for optically reading stored information from a data array having an approximate diameter $^D$A in a planar information bearing medium containing a plurality of data arrays, wherein a beam of radiation is addressed to a given data array to project an image representative of said data array upon a detector array having a diameter $^D$D, and wherein each data array contains a plurality of bits, each of an approximate diameter $^D$B, in a predetermined pattern and the detector array contains a plurality of detectors in the same predetermined pattern, characterized by the combination of an electron beam pumped laser device comprising:

a planar laser material having an approximate addressable diameter L, and means for providing a two dimensional radiation beam scan from a broad plane of the laser material in response to a two dimensional scan of a broad plane of the material by an electron beam, wherein the diameter of the radiation beam spot at the laser material is substantially less than $^D B$ and wherein when stimulated emission is produced from the laser material, the radiation beam is emitted normal to the laser material plane in a cone which diverges at an angle $\theta$ a detector array; and means for positioning said information bearing medium between and in general alignment with the laser material, and detector array, planar parallel with the laser material, and apart from the laser material by a distance Z, which is equal to $({}^{D}A/D_D)$ $[(L/\theta + ({}^{D}D/\theta)]$, and such that $\theta Z \geq 2D_A$ whereby, when a radiation beam is produced from a location on the laser material, an image of said given data array positioned within said cone of radiation and in an optical path including the detector array and the radiation emitting location on the laser material is projected onto the detector array.

5. A system for optically reading in parallel with a plurality of detectors contained in a detector array, information stored in a given one of a plurality of discrete areas contained in a planar information bearing medium; wherein when a beam of electromagnetic radiation is addressed to any given discrete area, an image representative of said given discrete area is projected onto the detector array, characterized by the feature that the means for both addressing any given discrete area and projecting an image representative of any said given discrete area onto said detector array, consists of a cathode ray tube comprising an electron gun for producing an electron beam, a planar screen positioned parallel with the planar information bearing medium, and comprising material for emitting a conical beam of electromagnetic radiation normal to the screen plane in response to impingement by said electron beam, and means for deflecting said electron beam to provide a said conical electromagnetic radiation beam from a selected location on the screen for addressing any said given discrete area for projecting onto the detector array an image of said addressed discrete area positioned within said cone of radiation and in an optical path including the detector array and the selected location on the screen.

* * * * *

UNITED STATES PATENT OFFICE
CERTIFICATE OF CORRECTION

Patent No. 3,786,438 Dated January 15, 1974

Inventor(s) James R. Packard

It is certified that error appears in the above-identified patent and that said Letters Patent are hereby corrected as shown below:

In the Abstract

Line 13, change "plath" to -- path --.

In the Patent

Column 1, lines 9 and 10, change "U.S. Patent No." to -- Serial No. --;

line 24, change "impingement" to -- the --.

Column 3, lines 26-34, rewrite the equations as follows:

$$\frac{L/2}{\theta/2} = A, \frac{D_D/2}{\theta/2} = B, \text{ and } \frac{X/2}{\theta/2} = (A + B);$$

and $$\frac{X}{D_D} = \frac{Y}{D_A}, \frac{Y}{2} = Z(\theta/2). \text{ Then}$$

$$Z = \frac{Y}{2\theta/2} = \frac{D_A X}{2D_D\theta/2} = \frac{D_A}{D_D}(A+B)\frac{\theta/2}{\theta/2}. \text{ Thus,}$$

$$Z = \frac{D_A}{D_D}\left[\frac{L}{\theta} + \frac{D_D}{\theta}\right].$$

Also, $\theta Z$ must be greater than or equal to $2D_A$.

Column 5, bottom line, change "the" to -- impingement --.

Signed and sealed this 8th day of October 1974.

(SEAL)
Attest:

McCOY M. GIBSON JR.
Attesting Officer

C. MARSHALL DANN
Commissioner of Patents